Jan. 19, 1965     I. H. HALLBERG     3,166,051
UNTHROTTLED INTERNAL COMBUSTION ENGINE
Original Filed Sept. 28, 1960
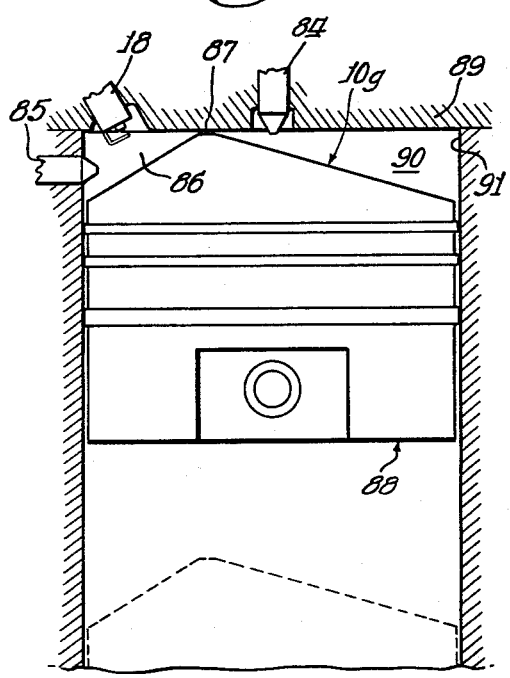
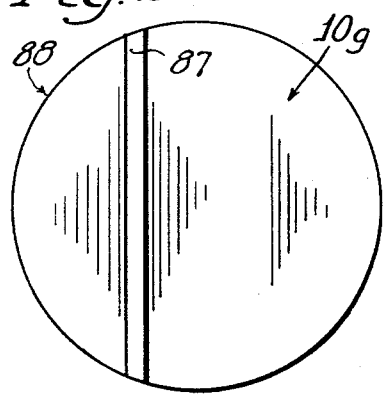
Inventor:
Irving H. Hallberg

United States Patent Office 3,166,051
Patented Jan. 19, 1965

3,166,051
UNTHROTTLED INTERNAL COMBUSTION ENGINE
Irving H. Hallberg, Des Plaines, Ill., assignor to Borg-Warner Corporation, Chicago, Ill., a corporation of Illinois
Original application Sept. 28, 1960, Ser. No. 59,087, now Patent No. 3,079,901, dated Mar. 5, 1963. Divided and this application Dec. 26, 1962, Ser. No. 264,462
3 Claims. (Cl. 123—32)

This application is a division of application Serial No. 59,087, filed September 28, 1960 for Unthrottled Internal Combustion Engine, now Patent No. 3,079,901.

My invention relates to unthrottled internal combustion engines, and, more particularly, to an engine of this type wherein the fuel is ignited by means of a spark plug and wherein an auxiliary ignition chamber is provided by means including an irregular crown of the piston when the piston comes into close proximity with the cylinder head at the top of the piston stroke.

A full complement of air is provided with each cycle of operation, and, only the amount of fuel supplied to the engine varies, therefore improving thermal efficiency which results in improved fuel economy and a reduction of hydrocarbon content in the exhaust gas as compared with most conventional spark ignition engines in which power is changed by varying both fuel and air quantity to maintain a fixed mixture ratio.

Most unthrottled internal combustion engines are complex, requiring considerable engine design change, leading to high costs and therefore giving little commercial promise. The engine, according to my invention, uses conventional parts with slight modification in the shape of the crown of the piston and possibly the cylinder head and only the addition of a simplified injection system. Engines of this type have been built wherein an auxiliary ignition chamber is provided in the cylinder head. Such an ignition chamber has a constricted throat connected with a main combustion chamber which lies between the piston head and the cylinder head. A spark plug is inserted in the auxiliary ignition chamber and fuel is injected into the auxiliary ignition chamber whereby a rich mixture is provided in the auxiliary ignition chamber and a lean mixture in the main combustion chamber. This arrangement provides a mixture sufficiently rich for ignition by spark. However, the constriction between the auxiliary ignition chamber and the main combustion chamber may become exceedingly hot, thereby causing pre-ignition. In an engine, according to my invention, a combustion space is provided at top dead center of the piston between the crown of the piston and the cylinder head which comprises an auxiliary ignition chamber and a residual combustion space which is comparable to the main combustion chambers of currently known throttled internal combustion engines. However, the design of my engine is such that when the fuel is ignited in the auxiliary ignition chamber, which is of a richer mixture than that of the residual combustion space or chamber, there is no danger of preignition because no such constriction referred to above exists between the two chambers. Consequently, overheating of a portion of metal within a combustion area is avoided and the danger of preignition from such a cause is eliminated. Complete scavanging of the auxiliary ignition chamber, after combustion, is not possible in the type of engine referred to above because of the constriction between the auxiliary combustion chamber and the main combustion chamber. This incomplete scavenging results in a limitation of the maximum power obtainable from a given size engine and dilution of the ignition mixture with exhaust gases. In an engine, according to my invention, complete scavenging is not interfered with because after combustion the auxiliary ignition chamber and the residual combustion space become one chamber.

It is therefore a primary object of my invention to provide an internal combustion engine which has characteristics which improve thermal efficiency resulting in improved fuel economy at part load and reduction of hydrocarbons in the exhaust gas.

It is also a primary object of my invention to provide a spark ignition unthrottled internal combustion engine having an auxiliary ignition chamber and a residual combustion space wherein complete scavanging occurs with respect to the auxiliary ignition chamber.

It is an important object of my invention to provide an unthrottled internal combustion engine which has the smooth combustion characteristics of a conventional internal combustion engine.

It is also an important object of my invention to provide an unthrottled internal combustion engine wherein a pocket or ignition cell and a main combustion chamber are provided each having a separate fuel supply means.

It is another object of my invention to reduce the possibilities of preignition in unthrottled internal combustion engines.

It is a further object of my invention to provide an unthrottled spark ignition internal combustion engine which is simple in construction, requiring little change in engine design as compared with throttled internal combustion engines and therefore is low in manufacturing costs.

It is still another object of my invention to provide an unthrottled internal combustion engine wherein the pressure rise of the ignited fuel is gradual thereby giving the smoother combustion characteristics of an Otto cycle engine rather than the rough characteristics of a diesel engine.

My invention consists of the novel constructions, arrangements and devices to be hereinafter described and claimed for carrying out the above stated objects and such other objects as will be apparent from the following description of the invention, illustrated with reference to the accompanying drawings, wherein:

In the drawing a piston 88 provided with a ridge 87 on an irregular crown 10g is operable in a cylinder 91. The ridge 87 provides a pocket 86 which forms an auxiliary ignition chamber when the piston 88 is at approximately top dead center and on the opposite side of the ridge 87 a main combustion chamber 90 is formed. A variable quantity injection nozzle 84 and a constant quantity injection nozzle 85 are provided for supplying fuel to the main combustion chamber 90 and the pocket 86, respectively. A spark plug 18 is inserted in the area of the pocket 86.

FIG. 1 is a side elevational view, partially in section, of the piston, cylinder, injection nozzles and spark plug of an unthrottled internal combustion engine, and FIG. 2 is a plan view of the crown of the piston disclosed in FIG. 1.

In operation, the variable quantity injection nozzle 84 injects a lean variable quantity of fuel at some point during the intake stroke or at the beginning of the compression stroke. Fuel for this purpose could also be provided by a carburetor with a variable jet. Fuel from the constant quantity injection nozzle 85 is supplied in a small constant quantity into the pocket 86, which, at T.D.C. of the piston 88 becomes an auxiliary ignition chamber which is formed within the confines of the ridge 87 on the irregular crown 10g of the piston 88, and the cylinder head 89, when the piston 88 is at T.D.C.

This fuel mixture provided by the constant quantity injection nozzle 85 is sufficiently rich to be ignited by the spark plug 18. From this focal point of ignition, the combustion spreads to the main combustion chamber 90.

For the sake of simplicity and clarity, the invention has been described as applied to an engine having but one cylinder; obviously it is applicable to a multiple cylinder internal combustion engine.

It is to be understood that the invention is not to be limited to the specific constructions and arrangements shown and described, except only insofar as the claims may be so limited, as it will be understood to those skilled in the art that changes may be made without departing from the principles of the invention.

I claim:

1. In an unthrottled internal combustion engine having a cylinder, air intake means and exhaust means for said cylinder, a cylinder head, a piston, said piston having an irregular crown and reciprocally operable in said cylinder, a combustion space between said cylinder head and said irregular crown, the said combustion space comprising an auxiliary ignition chamber and a residual combustion space when the said piston is substantially at T.D.C., said irregular crown providing means which separates said auxiliary ignition chamber from said residual combustion space, a spark plug inserted in said auxiliary ignition chamber, fuel injection means for supplying fuel to said auxiliary ignition chamber, fuel injection means for supplying fuel to said combustion space, said fuel supply being richer in mixture in said auxiliary ignition chamber than in the remainder of said combustion space and means for supplying electric current to said spark plug to thereby ignite said richer fuel mixture in said auxiliary ignition chamber.

2. In an unthrottled internal combustion engine having a cylinder, air intake means and exhaust means for said cylinder, a cylinder head, a piston, said piston having an irregular crown and reciprocally operable in said cylinder, a combustion space between said cylinder head and said irregular crown, the said combustion space comprising an auxiliary ignition chamber and a residual combustion space when the said piston is substantially at T.D.C., said irregular crown comprising a ridge which separates said auxiliary ignition chamber from said residual combustion space, a spark plug inserted in said auxiliary ignition chamber, fuel injection means for supplying fuel to said auxiliary ignition chamber, fuel injection means for supplying fuel to said combustion space, said fuel supply being richer in mixture in said auxiliary ignition chamber than in the remainder of said combustion space and means for supplying electric current to said spark plug to thereby ignite said richer fuel mixture in said auxiliary ignition chamber.

3. In an unthrottled internal combustion engine having a cylinder, air intake means and exhaust means for said cylinder, a cylinder head, a piston, said piston having an irregular crown and reciprocally operable in said cylinder, a combustion space between said cylinder head and said irregular crown, the said combustion space comprising an auxiliary ignition chamber and a residual combustion space when the said piston is substantially at T.D.C., said irregular crown comprising a ridge which separates said auxiliary ignition chamber from said residual combustion space, a spark plug inserted in said auxiliary ignition chamber, first fuel supply means for supplying fuel to said auxiliary ignition chamber, second fuel supply means for supplying fuel to said combustion space, said fuel supply being richer in mixture in said auxiliary ignition chamber than in the remainder of said combustion space and means for supplying electric current to said spark plug to thereby ignite said richer fuel mixture in said auxiliary ignition chamber.

No references cited.